(12) United States Patent
Doolin

(10) Patent No.: US 9,973,609 B2
(45) Date of Patent: May 15, 2018

(54) HANDHELD CONTROLLER FOR A MOTORIZED WHEEL

(71) Applicant: Inboard Technology, Inc., Burlingame, CA (US)

(72) Inventor: Paige Doolin, San Francisco, CA (US)

(73) Assignee: Inboard Technology, Inc., Soquel, CA (US)

( * ) Notice: Subject to any disclaimer, the term of this patent is extended or adjusted under 35 U.S.C. 154(b) by 0 days. days.

(21) Appl. No.: 15/060,559

(22) Filed: Mar. 3, 2016

(65) Prior Publication Data

US 2016/0261731 A1    Sep. 8, 2016

Related U.S. Application Data

(60) Provisional application No. 62/127,787, filed on Mar. 3, 2015.

(51) Int. Cl.
*H04M 1/725* (2006.01)
*G01C 21/34* (2006.01)
(Continued)

(52) U.S. Cl.
CPC .......... *H04M 1/7253* (2013.01); *B62K 11/14* (2013.01); *G01C 21/34* (2013.01);
(Continued)

(58) Field of Classification Search
CPC .................................................. H04M 1/7253
(Continued)

(56) References Cited

U.S. PATENT DOCUMENTS 5,653,305 A * 8/1997 Duke ..................... E06C 1/393
                                                        182/13
6,304,212 B1   10/2001 Aoki et al.
(Continued)

FOREIGN PATENT DOCUMENTS

CN        202169079 U    3/2012
WO     WO-2010/062521 A1  6/2010

OTHER PUBLICATIONS

International Search Report and Written Opinion issued in International Application No. PCT/US16/20773, dated May 26, 2016.
(Continued)

*Primary Examiner* — David S Luo
(74) *Attorney, Agent, or Firm* — Mintz Levin Cohn Ferris Glovsky and Popeo, P.C.

(57) ABSTRACT

A system for controlling the operation of a motorized wheel including a controller configured to control the operation of a motor for driving the motorized wheel, and a handheld device configured to receive inputs associated with the operation of the motor and to transmit instructions corresponding to the received inputs to the controller to control the operation of the motor via a wireless communication medium. The handheld device includes a main portion having a handgrip and a tail portion being biased toward the main portion to form an attachment mechanism by the main portion in cooperation with the tail portion, the attachment mechanism for attaching to a remote surface. The handheld device including a display for displaying information associated with the operation of the motorized wheel.

18 Claims, 9 Drawing Sheets

(51) Int. Cl.
  *G01S 19/42*  (2010.01)
  *H04W 4/00*  (2018.01)
  *H04W 4/02*  (2018.01)
  *B62K 11/14*  (2006.01)
  *G01C 21/36*  (2006.01)

(52) U.S. Cl.
  CPC .......... *G01C 21/3661* (2013.01); *G01S 19/42* (2013.01); *H04W 4/008* (2013.01); *H04W 4/021* (2013.01)

(58) Field of Classification Search
  USPC .................................................... 318/255, 34
  See application file for complete search history.

(56) References Cited

U.S. PATENT DOCUMENTS

| | | | |
|---|---|---|---|
| 6,802,636 B1 | 10/2004 | Bailey, Jr. | |
| 8,306,673 B1 | 11/2012 | Manning | |
| 8,430,192 B2 † | 4/2013 | Gillett | |
| 8,593,265 B1 * | 11/2013 | Dornfeld | G08C 17/00 182/127 |
| 9,586,471 B2 * | 3/2017 | Gillett | B60K 7/0007 |
| 2008/0143611 A1 | 6/2008 | Wang | |
| 2013/0081891 A1 | 4/2013 | Ulmen et al. | |
| 2013/0277128 A1 † | 10/2013 | Gillett | |
| 2014/0277888 A1 | 9/2014 | Dastoor et al. | |

OTHER PUBLICATIONS

YouTube screen shot of slideshow.†

* cited by examiner
† cited by third party

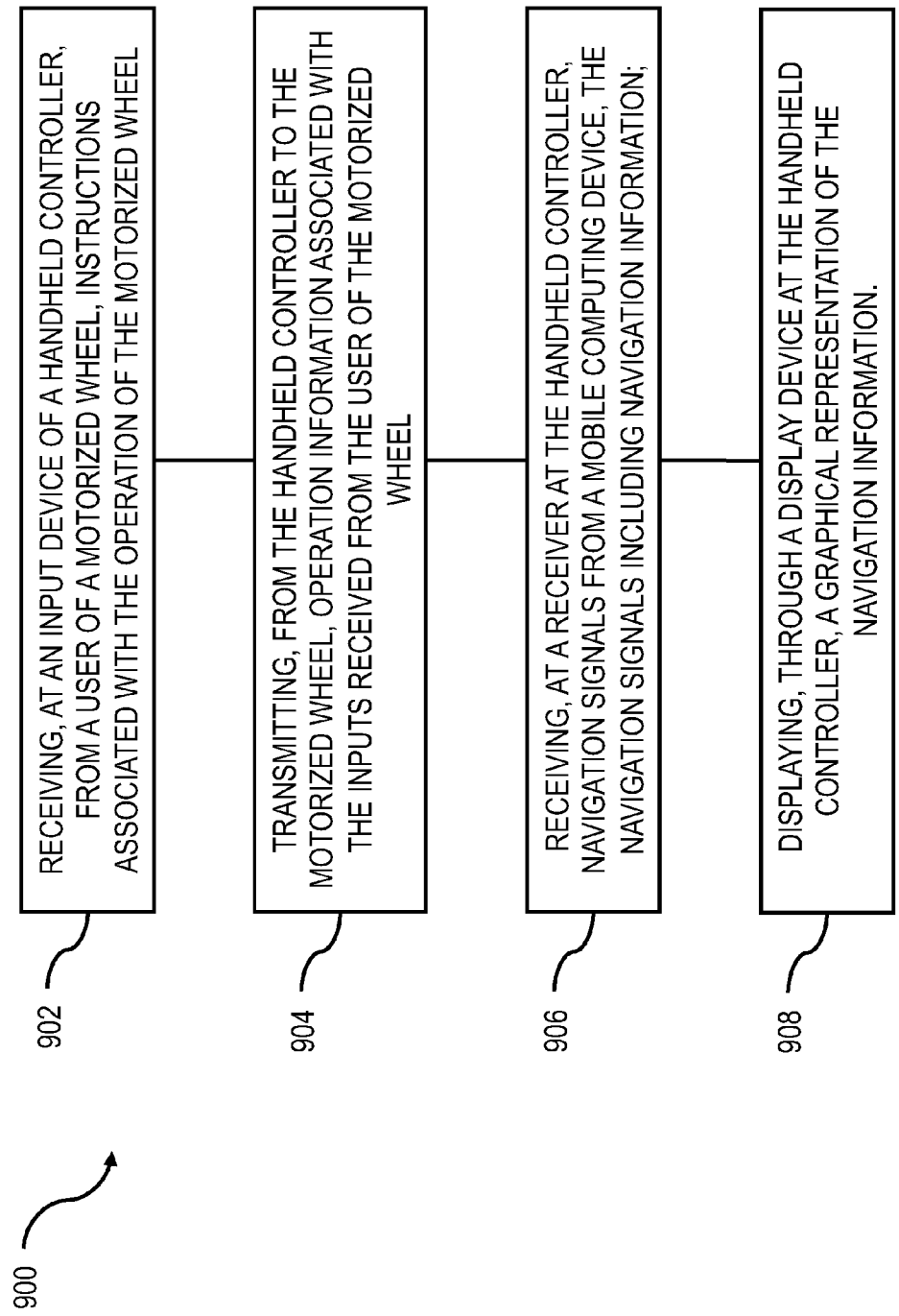

HANDHELD CONTROLLER FOR A MOTORIZED WHEEL

CROSS-REFERENCE TO RELATED APPLICATION

This application claims priority to and the benefit of U.S. Provisional Patent Application No. 62/127,787, filed on Mar. 3, 2015 and titled "Handheld Controller for a Motorized Wheel," the disclosure of which is incorporated by reference in its entirety.

TECHNICAL FIELD

The subject matter described herein relates to a handheld controller for a motorized wheel.

BACKGROUND

Motorized wheels can be used in a variety of devices. Typically motors are controlled through inputs received from input devices, such as levers, switches, and buttons that are electronically connected to the motor. Typically these connections are direct, such that electrical wires connect the input devices to the electric motor.

Motorized wheels can be found on scooters, bicycles, powered skateboards, and/or other devices adapted for transportation purposes.

Transportation devices that have been traditionally designed to be propelled under human power can not be configured to allow control of a motor through the use of direct connections between input devices and the motor. For example, skateboards are typically stood upon by the user with propelling force required to move the skateboard usually coming from the rider having one foot on the deck of the skateboard and another pushing off from the ground.

Summary In one aspect, a controller for a motorized wheel is described. The controller can include a housing. The housing can be configured to be held in the hand of an operator of the motorized wheel. The controller can include an input device. The input device can be disposed on the housing. The input device can be configured to receive inputs from the user. The inputs can be associated with the operation of the motorized wheel.

The controller can include a transmitter. The transmitter can be configured to transmit instructions from the handheld controller to the motorized wheel. The instructions can include operation information associated with the inputs received at the input device.

The housing can include a main portion. The main portion can have a handgrip between a first end and a second end. The housing can include a tail portion. The tail portion can have a first end attached to the first end of the main portion and a second end directed substantially toward the second end of the main portion. The tail portion can be biased toward the main portion to form an attachment mechanism by the main portion in cooperation with the tail portion. The attachment mechanism can be configured to attach the housing to a remote surface. The remote surface can be a deck of a powered skateboard.

The attachment mechanism of the handheld device can include a substantially ovular inner surface formed by the main portion and the tail portion. The attachment mechanism can include a gap between the second end of the main portion and the second end of the tail portion. The gap between the second end of the main portion and the second end of the tail portion can be configured to receive a support such that the handheld device is supported by the support.

The input device can include one or more of a button, a slider, a wheel, a sensor, a touchscreen, a gesture sensing device, or the like.

The controller can include a receiver. The receiver can be configured to receive information associated with the operation of the motorized wheel. The received information can be associated with a charge level of a battery used to power the motorized wheel. The receiver can be a Bluetooth receiver.

The housing can include a display unit. The display unit can be configured to display information associated with the operation of the motorized wheel. The information can be received from a mobile computing device. The display unit can be configured to display the information received from the mobile computing device.

The information received from the mobile computing device can be navigation information. The display device can be configured to present navigation information to the user.

The controller can include a global navigation satellite system (GNSS) signal receiver disposed within the housing. The GNSS signal receiver can be configured to receive geolocation signals from at least one GNSS satellite. The controller can include a computer processor. The computer processor can be configured to perform one or more operations. The one or more operations can include receiving geographic destination information from a mobile computing device. The operations can include determining a current location based on the received geolocation signals. The operations can include determining a route based on an electronic map from the current location to the geographic destination. Presentation, on the display device, of route information to the user can be facilitated. The route information can be associated with the determined route.

In one aspect, a method of controlling a motorized wheel is described. The method can include receiving, at an input device of a handheld controller, from a user of a motorized wheel, instructions associated with the operation of the motorized wheel. The operations can include transmitting, from the handheld controller to the motorized wheel, operation information associated with the inputs received from the user of the motorized wheel.

Information associated with a charge level of a battery used to power the motorized wheel can be received through a receiver at the handheld controller.

A graphical representation of the charge level the battery can be displayed through a display device at the handheld controller.

Navigation signals can be received from a mobile computing device. The navigation signals can include navigation information. A graphical representation of the navigation information can be presented to the user through the display.

In another aspect, a system for controlling the operation of a motorized wheel is described. The system can comprise a controller. The controller can be in electrical connection with a motor. The controller can be configured to control the operation of the motor. The controller can be configured to control the speed at which the motor rotates. The controller can be configured to control the rate at which the motor accelerates and decelerates.

The system can comprise a handheld device. The handheld device can host the controller. The handheld device can be configured to receive inputs associated with the operation of the motor. The handheld device can be configured to transmit instructions corresponding to the received inputs to the controller to control the operation of the motor. The handheld device can be configured to transmit instruction via a wireless communication medium.

The handheld device can comprise a main portion having a first end and a second end. The handheld device can comprise a handgrip between the first end and the second end. The handheld device can comprise a tail portion having a first end and a second end. The first end of the tail portion can be attached to a first end of the handgrip portion. The second end of the tail portion can be directed substantially toward the second end of the main portion. The tail portion can be biased toward the main portion. The bias of the tail portion can be configured to form an attachment mechanism by the main portion in cooperation with the tail portion. The attachment mechanism can be adapted for attaching to a remote surface.

The attachment mechanism of the handheld device can have a substantially ovular inner surface. The handheld device can include a gap between the second end of the main portion and the second end of the tail portion. The gap between the second end of the main portion and the second end of the tail portion can be configured to receive a support. For example, the gap between the second end of the main portion and the second end of the tail portion can be configured to receive an edge of a skateboard deck, a pocket, a bag strap, a truck portion of a skateboard, and/or other support. The handheld device can be supported by the support.

The handheld device can comprise one or more input devices. The one or more input devices can be configured to receive inputs from a user of the handheld device. The handheld device can comprise a transmitter. The transmitter can be a wireless transmitter. The wireless transmitter can be configured to transmit radio frequency signals. The transmitter can be configured to transmit instructions to the controller for controlling the motorized wheel. The transmitted instructions can correspond to the inputs received through the input devices of the handheld device. Each of the one or more input devices can include one or more of a button, a slider, a wheel, a sensor, and/or other input devices.

The handheld device can include a receiver. The receiver can be a wireless receiver. The wireless receiver can be configured to receive radio-frequency signals. The radio-frequency signals can be Bluetooth signals. The receiver can be configured to receive information associated with the operation of the motorized wheel from the control unit for the motorized wheel. For example, where the motor for the motorized wheel is an electrical motor, the received information can be associated with a charge level of a battery used to power the electric motor. The handheld device can include a display unit. The display unit can be configured to display information associated with the operation of the motorized wheel. The display unit can be configured to display a charge level of the battery used to provide power to the electric motor of the motorized wheel.

The handheld device can include a transceiver configured to communicate with external devices. The transceiver can be configured to transmit and/or receive radio-frequency signals. The transceiver can be configured to transmit and/or receive Bluetooth signals.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
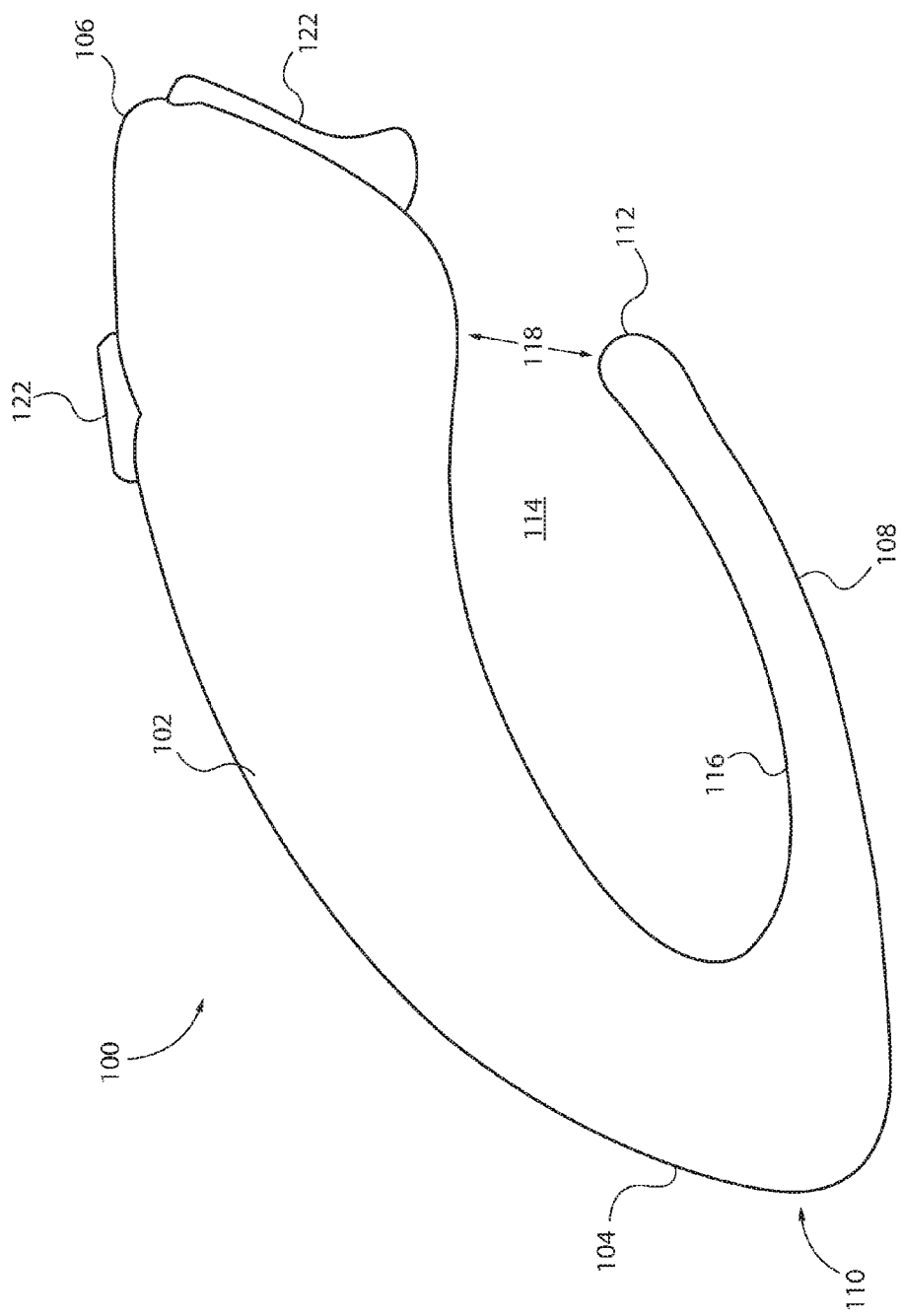
FIG. 1 is an exemplary embodiment of a handheld device having one or more features consistent with implementations of the current subject matter.

FIG. 1 shows an exemplary embodiment of a handheld device 100 having one or more features consistent with implementations of the current subject matter. The handheld device 100 can be configured to facilitate control of a motor. In some variations, the handheld device 100 can be configured to communicate with a controller. The controller can be in electrical communication with the motor. The controller can be configured to control the motor. In some variations, the handheld device 100 can host the controller. The handheld device 100, hosting the controller, can be configured to communicate with the motor to control the motor. The controller, whether hosted with the motor or hosted in the handheld device can be configured to control the speed at which the motor rotates. The controller can be configured to control the rate at which the motor accelerates and decelerates.

Figure 2:
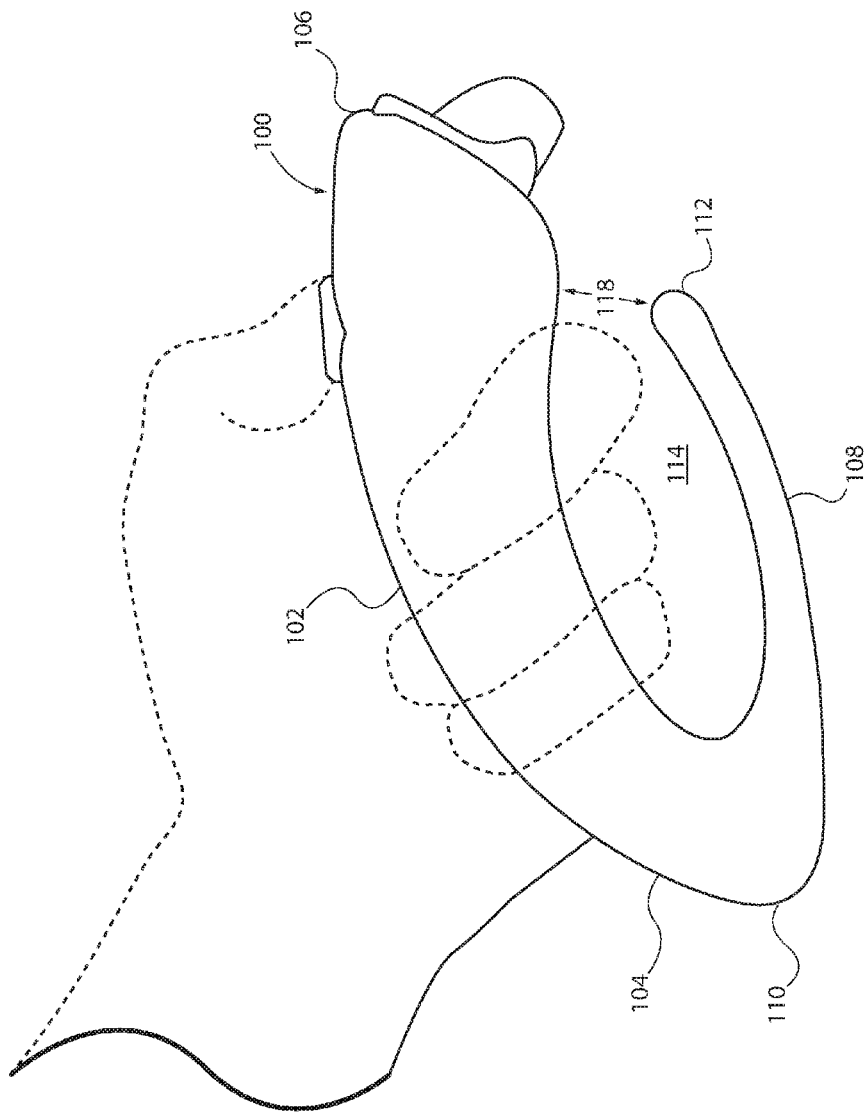
FIG. 2 is an exemplary embodiment of a handheld device in use by a user having one or more features consistent with implementations of the current subject matter.

With reference to FIGS. 1 and 2, the handheld device 100 can comprise a main portion 102 having a first end 104 and a second end 106. The handheld device 100 can comprise a handgrip 108 between the first end 104 and the second end 106. The handheld device 100 can comprise a tail portion 108 having a first end 110 and a second end 112. The first end 110 of the tail portion 108 can be attached to a first end 104 of the main portion 102. The second end 112 of the tail portion 108 can be directed substantially toward the second end 106 of the main portion 102. The tail portion 108 can be biased toward the main portion 102. The bias of the tail portion 108 can be configured to form an attachment mechanism 114 by the main portion 102 in cooperation with the tail portion 108. The attachment mechanism 114 can be adapted for attaching to a remote surface.

Figure 4:
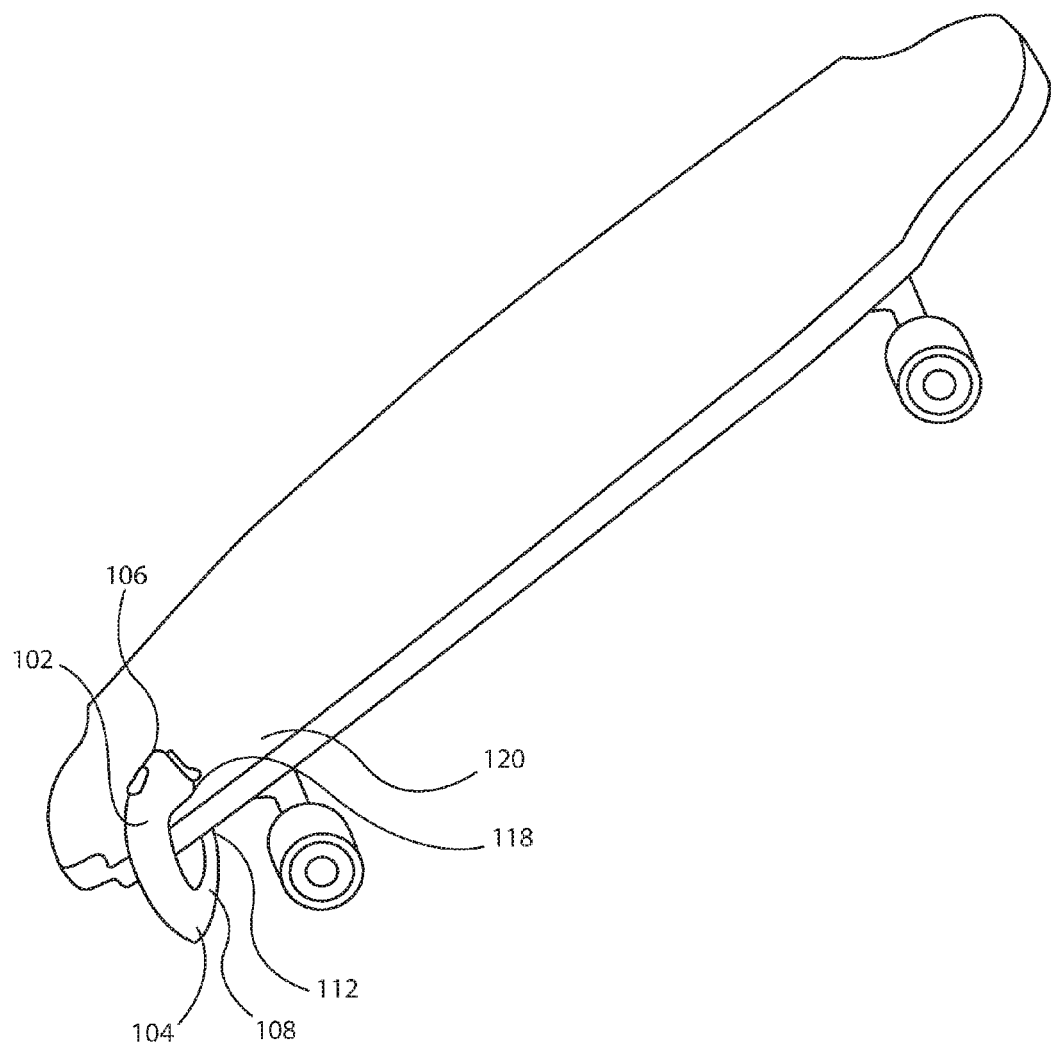
FIG. 4 is an exemplary embodiment of a handheld device being stored having one or more features consistent with implementations of the current subject matter.

The attachment mechanism 114 of the handheld device can have a substantially ovular inner surface 116. The handheld device 100 can include a gap 118 between the second end 106 of the main portion 102 and the second end 112 of the tail portion 108. The gap 118 between the second end 106 of the main portion 102 and the second end 112 of the tail portion 108 can be configured to receive a support. Referring to FIG. 4, as an example, the gap 118 between the second end 106 of the main portion 102 and the second end 112 of the tail portion 108 can be configured to receive an edge of a skateboard deck 120. Other examples of things that the attachment mechanism can engage with include, but are not limited to a pocket, a bag strap, a truck portion of a skateboard, and/or other support. The handheld device 100 can be supported by the support.

The tail portion 108 can be flexible. The tail portion 108 can be configured to provide a force resisting any opposing force. The resistive force provided by the tail portion 108 can facilitate securing the handheld device 100 to the support. The resistive force provided by the tail portion 108 can facilitate securing the handheld device 100 to a user's hand, prohibiting the handheld device 100 from being dropped. The resistive force provided by the tail portion 108 can facilitate securing the handheld device 100 to a user's hand when the hand is open or closed.

The main portion 102 can comprise one or more of a composite material, a plastic material, a silicon material, and/or other materials adapted to support the internal electronics inside the handheld device 100. The tail portion 108 can comprise from flexible material, for example, flexible plastic material, flexible silicon material, and/or other flexible materials. In some implementations, the tail portion 108 can comprise a spine (not shown) configured to provide resistive force to the tail portion 108. This resistive force can be in addition to any resistive force provided by the material of which the tail portion 108 is comprised. The spine can be internal to the outer surface of the tail portion 108.

Referring to FIG. 1, the handheld device can comprise one or more input devices 122. The one or more input devices 122 can be configured to receive inputs from a user of the handheld device 100.

Figure 3:
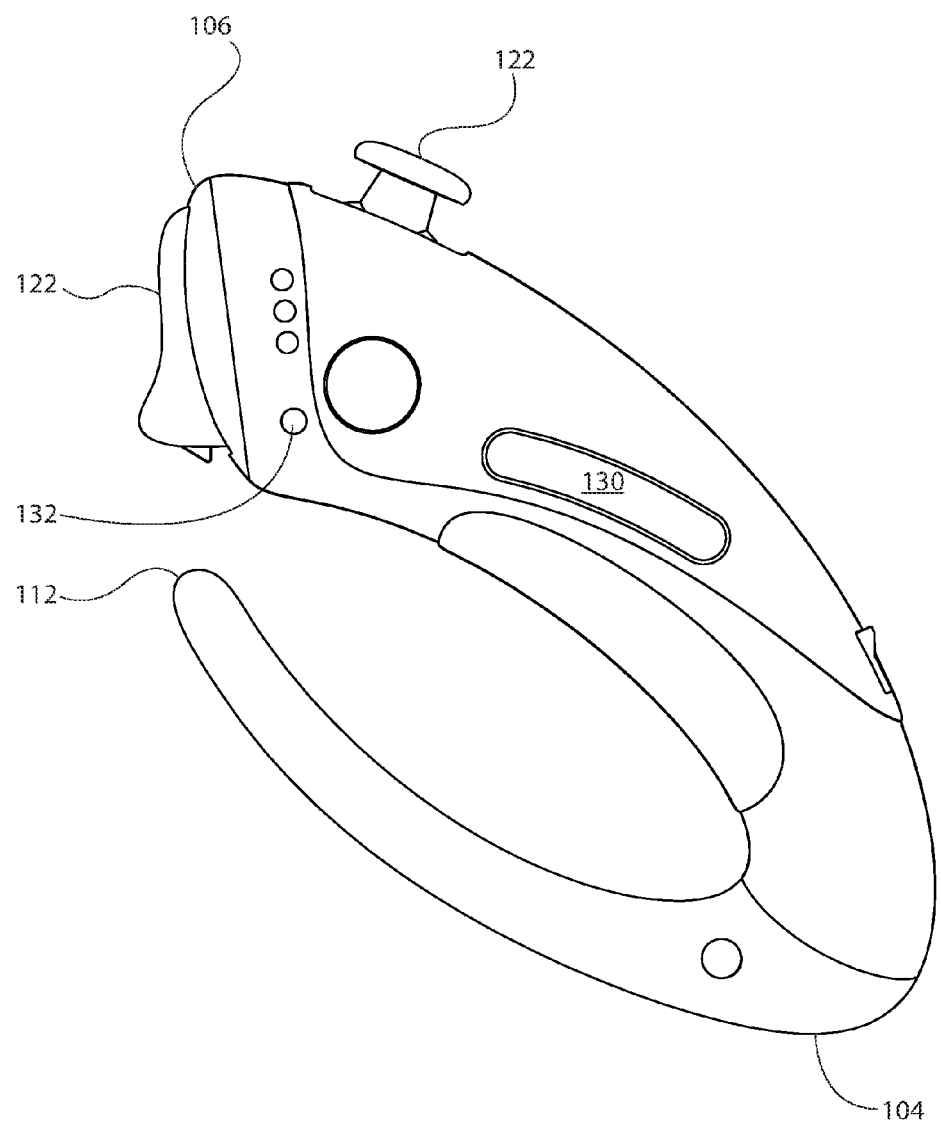
FIG. 3 is a top-down view of an exemplary embodiment of a handheld device having one or more features consistent with implementations of the current subject matter.

Referring to FIG. 3, illustrates is a top-down view of an exemplary embodiment of a handheld device 100 having one or more features consistent with implementations of the current subject matter. The handheld device 100 can include a display 130. The display 130 can be disposed on a surface of the handheld device 100, such that the display 130 can be viewed by the user of the motorized wheel when being held by the user. The display 130 can be an electronic visual display. The display 130 can be configured to present graphical representations of information to the user, the condition of one or more components of the motorized wheel to the user, navigation information to the user, notifications to the user, or the like.

In some variations, the handheld device 100 can include one or more user perceptible indications 132 providing an indication of the status of one or more components of the handheld device 100. In some variations, one or more user perceptible indications 132 can include LEDs. In some variations, the status of the one or more components can include a status of a battery for powering the motorized wheel.

In some variations, as described with respect to FIG. 5 below, the handheld device 100 can be in wireless electronic communication with a mobile computing device. The mobile computing device can be configured to facilitate transmission of information to the handheld device 100. The display 130 can be configured to present graphical representations of the information received from the mobile computing device.

In some variations, the mobile computing device can be configured to facilitate entry and/or determination of a current location or a start location of the mobile computing device. The mobile computing device can be configured to facilitate entry, by a user, of a desired destination. The mobile computing device can be configured to determine a route between the start location and the desired destination. The mobile computing device can be configured to transmit route information to the handheld device 100 for presentation as a graphical representation on the display 130.

Figure 5:
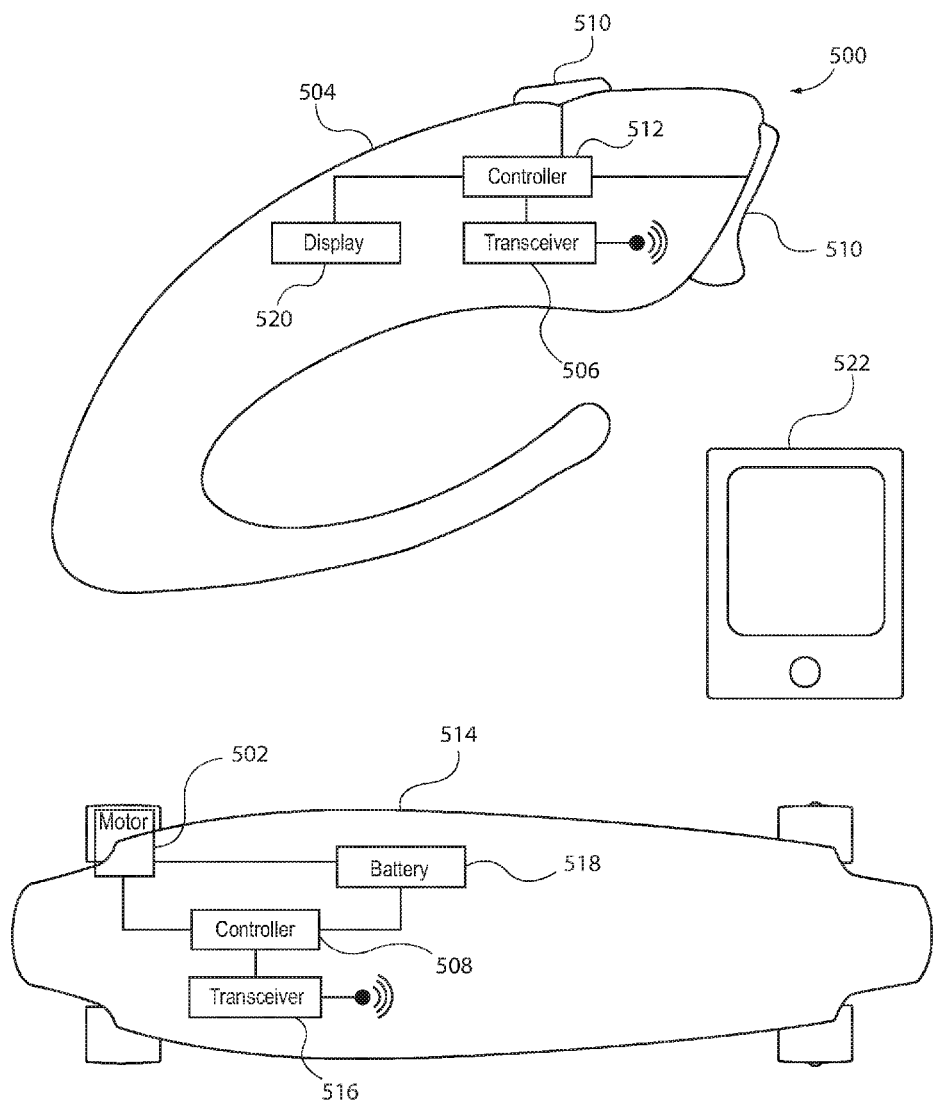
FIG. 5 is a schematic diagram of an exemplary embodiment of a system for controlling an electric motor having one or more features consistent with implementations of the current subject matter.

FIG. 5 is a schematic diagram of an exemplary embodiment of a system 500 for controlling a motor 502. The handheld device 504 can comprise a transceiver 506. While transceivers are illustrated in FIG. 4, transmitters and/or receivers can be put in place of the transceiver depending on whether information is only sent or received by the respective devices. The transceiver 506 can be a wireless transceiver. The wireless transceiver 506 can be configured to transmit and/or receive radio frequency signals. In embodiments where the controller 508 is co-located with the motor 502, the transceiver 506 in the handheld device 504 can be configured to transmit information to the controller 508 in response to an input received by the handheld device 504 through one or more of the input devices 510 of the handheld device. Each of the one or more input devices 510 can include one or more of a button, a slider, a wheel, a sensor, and/or other input devices. In embodiments where the controller 512 is hosted by the handheld device, the controller 512 can be configured to cause the transceiver 506 to transmit instructions to the motor 502 for controlling the motor 502 in accordance with the inputs received through the input devices 510.

The motive device 514, such as a powered skateboard, can include a transceiver 516. The transceiver 516 can be configured to transmit and/or receive information associated with the operation of the motive device 514. The transceivers 506, 516 can be configured to transmit and/or receive radio-wavelength signals. For example, in some implementations, the transceivers 506, 516 can be configured to transmit and/or receive one or more of WiFi signals, Bluetooth signals, Near-Field-Communication signals, and/or other signal formats and/or wavelengths.

The transceiver 516 of the motive device 514 can be configured to transmit information associated with the operation of the motive device 514. Where the motor 502 is an electric motor powered by a battery 518, the information transmitted by the transceiver 516 can include a level of charge of the battery 518 and/or other information associated with the battery 518. The transceiver 506 of the handheld device 502 can be configured to receive information associated with the operation of the motive device 514. For example, the information received can be associated with the charge level of the battery 518.

The handheld device 502 can include a display unit 520. The display unit 520 can be configured to display information associated with the operation of the motor 502. The display unit can be configured to display a charge level of the battery 518 used to provide power to the electric motor. The display unit can be an electronic visualdisplay, a touchscreen display, a series of lights indication a charge level, and/or any device capable of conveying to a user the transmitted information.

The handheld device 504 and/or the motive device 514, can include a transceiver 506 and 508, respectively, configured to communicate with mobile computing devices 522. In some implementations of the present subject matter, the handheld device 504 and the motive device 514 can communicate with the mobile computing device 522 through one another. For example, the transceiver 516 of the motive device 514 can communicate with the transceiver 506 of the handheld device 504 providing information associated with the motive device 514. The handheld device 504 may, in turn, communication that information with the mobile computing device 522. As an alternative example, the transceiver 506 of the handheld device 502 can communicate information to the transceiver 516 of the motive device 514. The motive device 514 may, in turn, cause the information to be transmitted to the mobile computing device 522.

Information provided by the handheld device 504 and/or the motive device 514, such as a powered skateboard, to the mobile computing device 522 can include, but not be limited to, battery charge information, speed information, mode of operation information, acceleration information, status information, error information, damage information, a mode of operation of the motive device, a length of time of operation of the motive device and other information associated with the motive device. The mobile computing device 522 can include one or more of a smartphone, a tablet, a computer, a laptop, a smartwatch, a vehicle, and/or other external device capable of receiving the information. The mobile computing device 522 can facilitate presentation of information associated with the motive device 514 and/or handheld device 504 to a user. For example, the mobile computing devices 522 can facilitate the presentation of the maximum speed, maximum acceleration, average speed, average acceleration, length of time in operation, distance traveled, and/or other information associated with the operation of the motive device 514.

The mobile computing devices 522 can be configured to receive input. The inputs can correspond to one or more modes and/or elements of the motive device 514 and/or the handheld device 504. Inputs and/or entries entered through n mobile computing devices 522 can select a user for the motive device 514. The motive device 514, handheld device 504, mobile computing devices 522, and/or other devices, can be configured to store information about different users, such as user preferences. In response to receiving an indication that a particular user is going to use the motive device 514, the motive device 514 can be configured with the preferred settings of that user. Inputs and/or entries entered through a mobile computing devices 522 can render the motive device 514, such as a powered skateboard, inoperable. The communications between the mobile computing devices 522, the motive device 514, and/or the handheld controller 504 can be via a wireless communication medium. Such wireless communication medium can include radio signals. Such radio signals can include Bluetooth signals and/or other short-range and/or long range radio signals.

The motor 502 and/or the controller 508 of the motive device 514 can be configured to have one or more modes. The one or more modes can be associated with performance characteristics of the motive device 514. For example, the motive device 514 can have beginner, advanced, eco, custom and/or other modes. Different modes can include settings, such as maximum speed, maximum acceleration, maximum distance from home, and/or other information. A user can select and/or enter a mode on the handheld device 504. The mode selection and/or entry can be transmitted by the transceiver 506 to the transceiver 516 of the motive device 514. The transceiver 516 of the motive device can be connected directly with the motor 502 or can be connected to a controller 508 of the motive device 514. The selected and/or entered mode received from the handheld device 504 can cause the controller 508 and/or motor 502 to have performance characteristics associated with the selected and/or entered mode.

In some variations, a mobile computing device 522 can be configured to facilitate entry and/or determination of a start location for a journey. The start location can be the current location of the mobile computing device 522. The mobile computing device can include a global navigation satellite system (GNSS) signal receiver. The mobile computing device 522 can be configured to determine the current location of the mobile computing device 522 based on the received GNSS signals.

The mobile computing device 522 can be configured to facilitate entry and/or selection of a desired destination by the user. The mobile computing device 522 can be configured to determine a route between the start location and the destination. A third-party application, such as Google Maps, Apple Maps, or the like, can be used to determine the route. Route information can be transmitted from the mobile computing device 522 to the handheld device 500. The handheld device 500 can be configured to facilitate presentation of a graphical representation of a direction on the display 520 of the handheld device 500. In some variations, the graphical representation of the direction can include an arrow, a map, a portion of the route on a map, or the like.

Route information can be transmitted from the mobile computing device 522 to the handheld device 500 continuously or discretely, where portions of the route, or the whole route are transmitted to the handheld device 500.

In some variations, the handheld device 500 can include a GNSS signal receiver. Destination information can be provided to the handheld device 500. The destination information can be transmitted to the handheld device 500 from a mobile computing device 522.

The handheld device 500 can be configured to determine a route between the current location and the destination location. The display 520 can be configured to provide a presentation of a graphical representation of the route to the user.

One or more input devices 510 can be configured to cause changes in the speed of the motor 502. One or more input devices 510 can be configured to cause changes in the rate of acceleration of the motor 502. Speed and/or acceleration information can be transmitted by transceiver 506 of the handheld device 504 to transceiver 516 of the motive device 514. The transceiver 516 can be configured to provide the speed and/or acceleration information to the controller 508 and/or the motor 502, depending on the configuration of the handheld device 504 and the motive device 514. One or more input devices 510 can include a kill switch. The kill switch can be configured to deactivate the motor 502 in response to the kill switch being activated. In some variations, the kill switch can be activated by the kill switch being pressed. In other variation, the kill switch can be activated by a user releasing the kill switch.

Figure 6A:
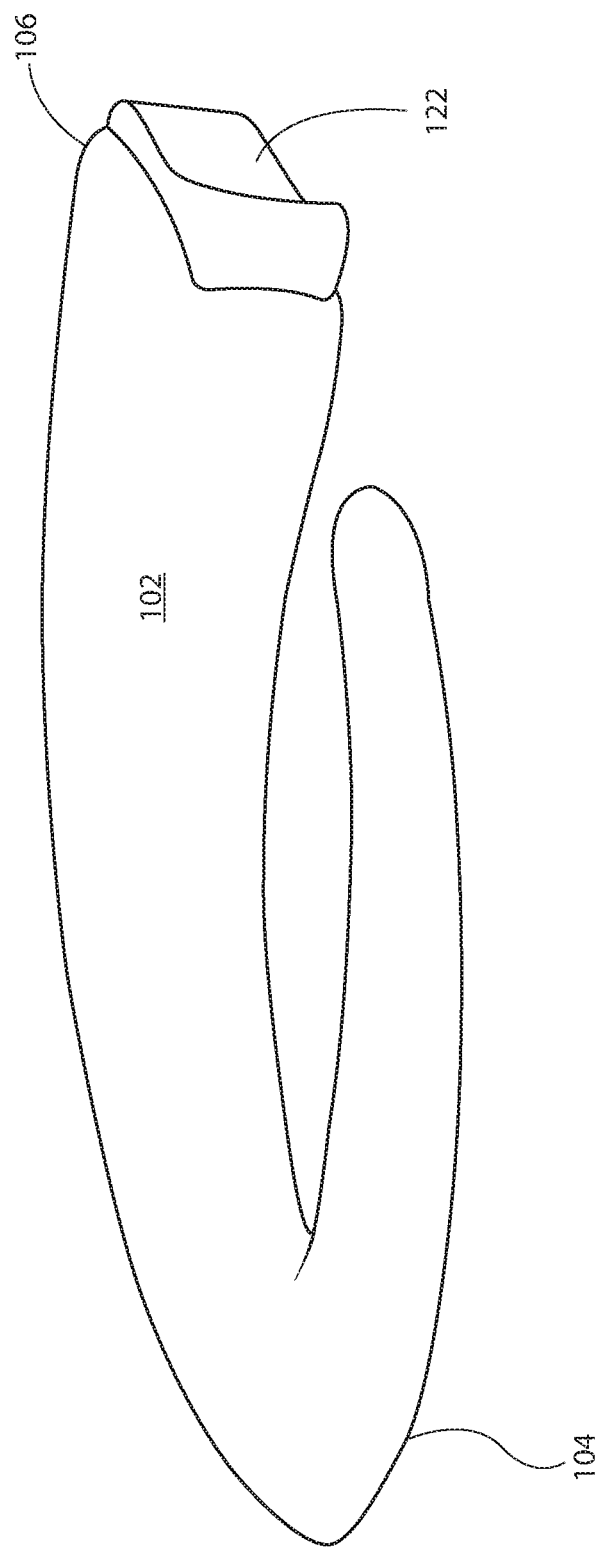
FIG. 6a is a side perspective view of an exemplary embodiment of a handheld device in use by a user having one or more features consistent with implementations of the currency subject matter.

FIG. 6 is a side perspective view of an exemplary embodiment of a handheld device 100 having one or more features consistent with implementations of the currency subject matter.

Figure 6B:
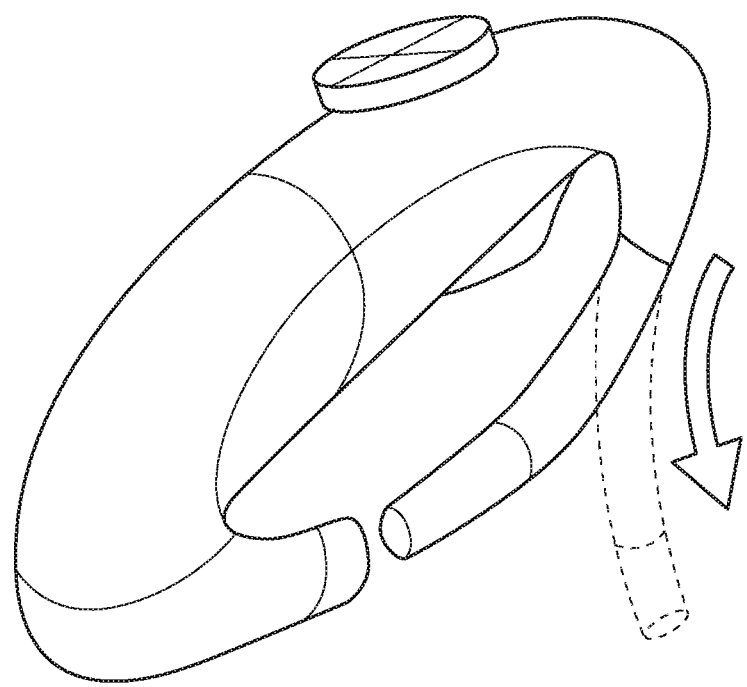
FIGS. 6b-6c are exemplary embodiments of the handheld device having one or more features consistent with implementations of the current subject matter.
Figure 6C:
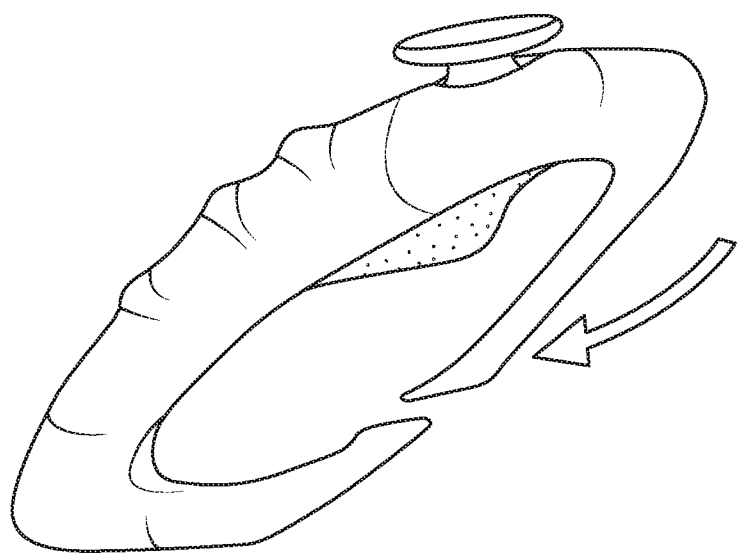

FIGS. 6b-6cb illustrate exemplary embodiments of the handheld device having one or more features consistent with implementations of the current subject matter.

Figure 7:
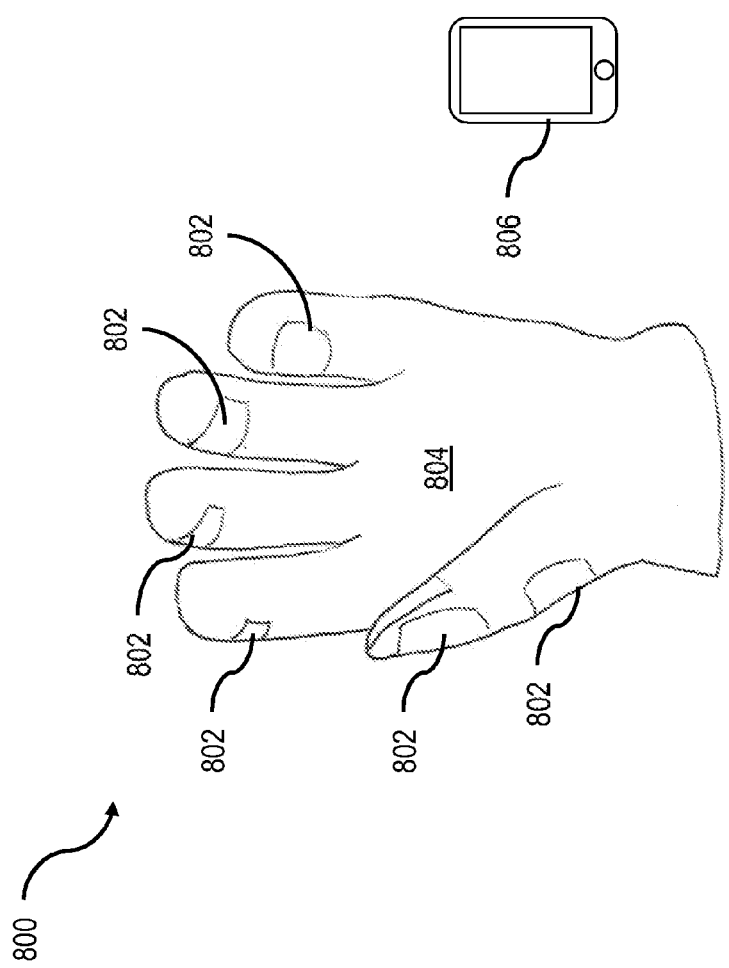
FIG. 7 is an illustration of a controller in the form of a glove for controlling a motorized wheel having one or more features consistent with the current subject matter; and, FIG. 8 is an illustration of a process for controlling a motorized wheel having one or more features consistent with the current subject matter.

FIG. 7 is an illustration of a glove-based control system 800 having one or more features consistent with the present description. One or more sensors 802 can be disposed within a glove 804. The one or more sensors 802 disposed within the glove 804 can be configured to determine a movement, or gesture, of the wearer of the glove based on a determination of the relative locations of one or more other sensors. A computer processor can be configured to facilitate determination of a command or instruction from the user based on a determination of the gestures provided by the user through movement of elements of the glove 804.

The glove can include one or more components configured to communicate with the motorized wheel of the powered skateboard through one or more components of the powered skateboard. The one or more components can be configured to communicate through a mobile computing device 806 with the motorized wheel of the powered skateboard.

FIG. 8 is a process flow diagram illustrating aspects of a method 900 for making a skateboard deck having one or more features consistent with implementations of the current subject matter. The method 900 for making a deck of a powered skateboard can include one or more operations. The order in which the operations of method 900 are illustrated in FIG. 8 and discussed herein is not intended to be limiting and can be changed where appropriate.

At 900, input can be received at an input device of a handheld controller, from a user of a motorized wheel. The input can include instructions associated with the operation of the motorized wheel.

At 902, operation information can be transmitted from the handheld controller to the motorized wheel. The operation information can be associated with the inputs received from the user of the motorized wheel.

At 904, information can be received through a receiver at the handheld controller. The information can be associated with a charge level of a battery used to power the motorized wheel.

At 906, navigation signals can be received at the controller from a mobile computing device, the navigation signals including navigation information.

At 908, a graphical representation of the navigation information can be presented to the user through the display.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A controller for a motorized wheel comprising:
    a housing, configured to be held in the hand of an operator of a motorized wheel;
    an input device disposed on the housing, the input device configured to receive inputs from the user, the inputs associated with the operation of the motorized wheel;
    a transmitter configured to transmit instructions from the controller to the motorized wheel, the instructions including operation information associated with the inputs received at the input device
    a main portion having a handgrip between a first end and a second end; and
    a tail portion having a first end attached to the first end of the main portion and a second end directed substantially toward the second end of the main portion, the tail portion being biased toward the main portion to form an attachment mechanism by the main portion in cooperation with the tail portion, the attachment mechanism for attaching to a remote surface.

2. The controller as claimed in claim 1, wherein the attachment mechanism of the handheld device further comprises:
    a substantially ovular inner surface formed by the main portion and the tail portion; and
    a gap between the second end of the main portion and the second end of the tail portion.

3. The controller as claimed in claim 2, wherein the gap between the second end of the main portion and the second end of the tail portion is configured to receive a support such that the handheld device is supported by the support.

4. The controller as claimed in claim 1, wherein the input device can includes one or more of a button, a slider, a wheel, a sensor, a touchscreen, and a gesture sensing device.

5. The controller as claimed in claim 1, further comprising:
    a receiver configured to receive information associated with the operation of the motorized wheel.

6. The controller as claimed in claim 5, wherein the received information is associated with a charge level of a battery used to power the motorized wheel.

7. The controller as claimed in claim 5, wherein the receiver is a Bluetooth receiver.

8. The controller as claimed in claim 5, wherein the housing further comprises:
  a display unit configured to display information associated with the operation of the motorized wheel.

9. The controller as claimed in claim 8, wherein the information is received from a mobile computing device, and the display unit is configured to display the information received from the mobile computing device.

10. The controller as claimed in claim 9, wherein the information received from the mobile computing device is navigation information and the display device is configured to present navigation information to the user.

11. The controller as claimed in claim 9, further comprising:
  a global navigation satellite system (GNSS) signal receiver disposed within the housing, the GNSS signal receiver configured to receive geolocation signals from at least one GNSS satellite;
  a processor configured to perform one or more operations, including:
    receiving geographic destination information from a mobile computing device;
    determining a current location based on the received geolocation signals;
    determining a route based on an electronic map from the current location to the geographic destination; and,
    facilitating presentation, on the display device, of route information to the user associated with the determined route.

12. A method of controlling a motorized wheel, the method comprising:
  receiving, at an input device of a handheld controller, from a user of a motorized wheel, instructions associated with the operation of the motorized wheel;
  transmitting, from the handheld controller to the motorized wheel, operation information associated with the inputs received from the user of the motorized wheel;
  receiving, at a global navigation satellite system (GNSS) signal receiver, geographic location signals;
  determining, using the geographic location signals, a current location of the handheld controller;
  receiving, at the handheld controller, destination information;
  determining, based on the current location and the destination information, a route from the current location to the destination information; and
  presenting, on a display at the handheld controller, a graphical representation of the route information.

13. The method as claimed in claim 12, further comprising:
  receiving, through a receiver at the handheld controller, information associated with a charge level of a battery used to power the motorized wheel.

14. The method as claimed in claim 13, further comprising:
  displaying, through the display device at the handheld controller, a graphical representation of the charge level the battery.

15. The method as claimed in claim 12, further comprising:
  receiving, at a receiver at the handheld controller, navigation signals from a mobile computing device, the navigation signals including navigation information; and,
  displaying, through the display device at the handheld controller, a graphical representation of the navigation information.

16. The method as claimed in claim 15, wherein the receiver is a Bluetooth receiver.

17. The method as in claim 12, wherein the destination information is received from a mobile computing device.

18. The method as in claim 12, wherein the route from the current location to the destination is determined by a mobile computing device.

* * * * *